(12) United States Patent
Lii et al.

(10) Patent No.: US 7,701,447 B2
(45) Date of Patent: Apr. 20, 2010

(54) METHOD FOR MULTIPLE OBJECTS DETECTION ON A CAPACITIVE TOUCHPAD

(75) Inventors: Jia-Yih Lii, Taichung (TW); Yung-Lieh Chien, Taoyuan (TW)

(73) Assignee: Elan Microelectronics Corporation, Hsinchu (TW)

( * ) Notice: Subject to any disclaimer, the term of this patent is extended or adjusted under 35 U.S.C. 154(b) by 1128 days.

(21) Appl. No.: 11/334,444

(22) Filed: Jan. 19, 2006

(65) Prior Publication Data
US 2007/0165005 A1    Jul. 19, 2007

(30) Foreign Application Priority Data
Jun. 8, 2005    (TW)    ............... 94118951 A

(51) Int. Cl.
*G06F 3/041* (2006.01)

(52) U.S. Cl. .................................................... 345/173

(58) Field of Classification Search ................. 345/173, 345/156, 174; 715/856; 178/18.01–19.03
See application file for complete search history.

(56) References Cited

U.S. PATENT DOCUMENTS

| | | | | | |
|---|---|---|---|---|---|
| 5,648,642 | A | * | 7/1997 | Miller et al. | ............. 178/18.06 |
| 5,825,352 | A | * | 10/1998 | Bisset et al. | ................. 345/173 |
| 5,880,411 | A | * | 3/1999 | Gillespie et al. | ......... 178/18.01 |

* cited by examiner

*Primary Examiner*—Richard Hjerpe
*Assistant Examiner*—Shaheda A Abdin
(74) *Attorney, Agent, or Firm*—Rosenberg, Klein & Lee

(57) ABSTRACT

A multiple objects detection method for a capacitive touchpad, through at least one preset time, whether it is noise and interference or an operation of object on touchpad is thus distinguished, actions such as object touches the touchpad, leaves the touchpad are then judged correctly, and different kinds of gesture operations are precisely detected.

18 Claims, 14 Drawing Sheets

METHOD FOR MULTIPLE OBJECTS DETECTION ON A CAPACITIVE TOUCHPAD

FIELD OF THE INVENTION

The present invention is generally related to a detection method for capacitive touchpad, and more specifically, to a multiple objects detection method for resisting noise.

BACKGROUND OF THE INVENTION

Capacitive touchpad is an input device for controlling cursor movement by providing smooth panel for finger to slide on it. Since capacitive touchpad is very thin, it can thus be designed into ultra-thin notebook, key board, digital player or other devices, besides, its non-mechanical design makes it very easy to be maintained.

FIG. 1 is the prior art two dimensional capacitive touchpad 100, comprising panel 102, Y axis sensing layer 104, insulated layer 106, X axis sensing layer 108 and bottom board 110. When finger 112 touches panel 102, the sensed value (capacitance value) on the touched location will have a change, and the control circuit connected to touchpad 100 can convert the capacitance on the touchpad into sensed value, as shown in FIG. 2, in order to judge finger location, amount of movement and direction of movement. In the prior art technology, the detected sensed value is used to judge if the object touches capacitive touchpad 100, this is as shown in FIG. 3, when sensed value is larger than critical value th, it means object touches touchpad 100, on the contrary, when sensed value is smaller than critical value th, it means object leaves touchpad 100 or object is not on touchpad 100.

However, touchpad 100 might be interfered by signals from wireless device such as cellular phone, etc., and generate noise, therefore, touchpad 100 might misjudge that object is touching, clicking, moving or performing any gesture operation on it. FIG. 4A is an example showing noise generated on touchpad 100, the noise is converted into sensed value through analog digital converter, as shown in FIG. 4B, finally through a sampling process, the waveform as in FIG. 4C is obtained, this kind of waveform is similar to the waveform generated when two fingers touch touchpad 100, as shown in FIG. 5, therefore, noise in FIG. 4A could be misjudged to be two fingers touching touchpad 100, this could lead to wrong operation.

Therefore, a detection method which can prevent interference from noise is highly expected.

SUMMARY OF THE INVENTION

An object of the present invention is to provide a multiple objects detection method for capacitive touchpad which can prevent the interference from noise.

According to the present invention, a multiple objects detection method for a capacitive touchpad is to set up at least a preset time to distinguish whether the sensed value change on touchpad is noise or operation of object on touchpad, actions such as object touches the touchpad, leaves the touchpad are then judged correctly, and different kinds of gesture operations are precisely detected.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

The detection method of the present invention does not need the improvement on hardware detection circuit to enhance noise resisting capability, besides, it can distinguish several gestures.

<Detection for Verifying Multiple Objects Touch>

Figure 1:
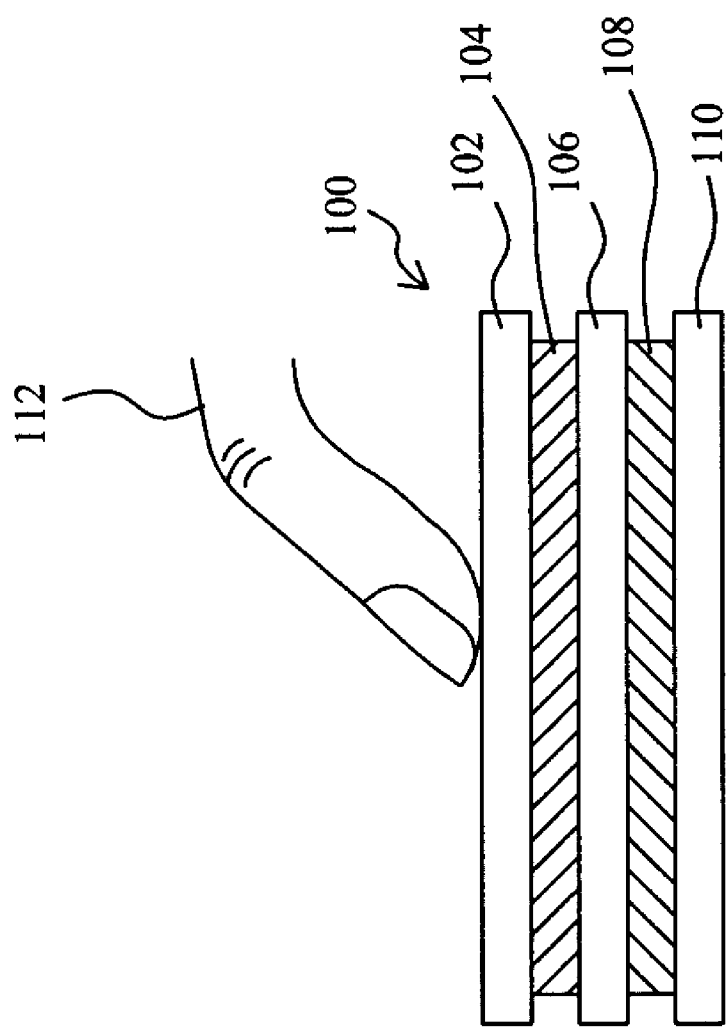
FIG. 1 is the two dimensional capacitive touchpad of the prior art.
Figure 2:
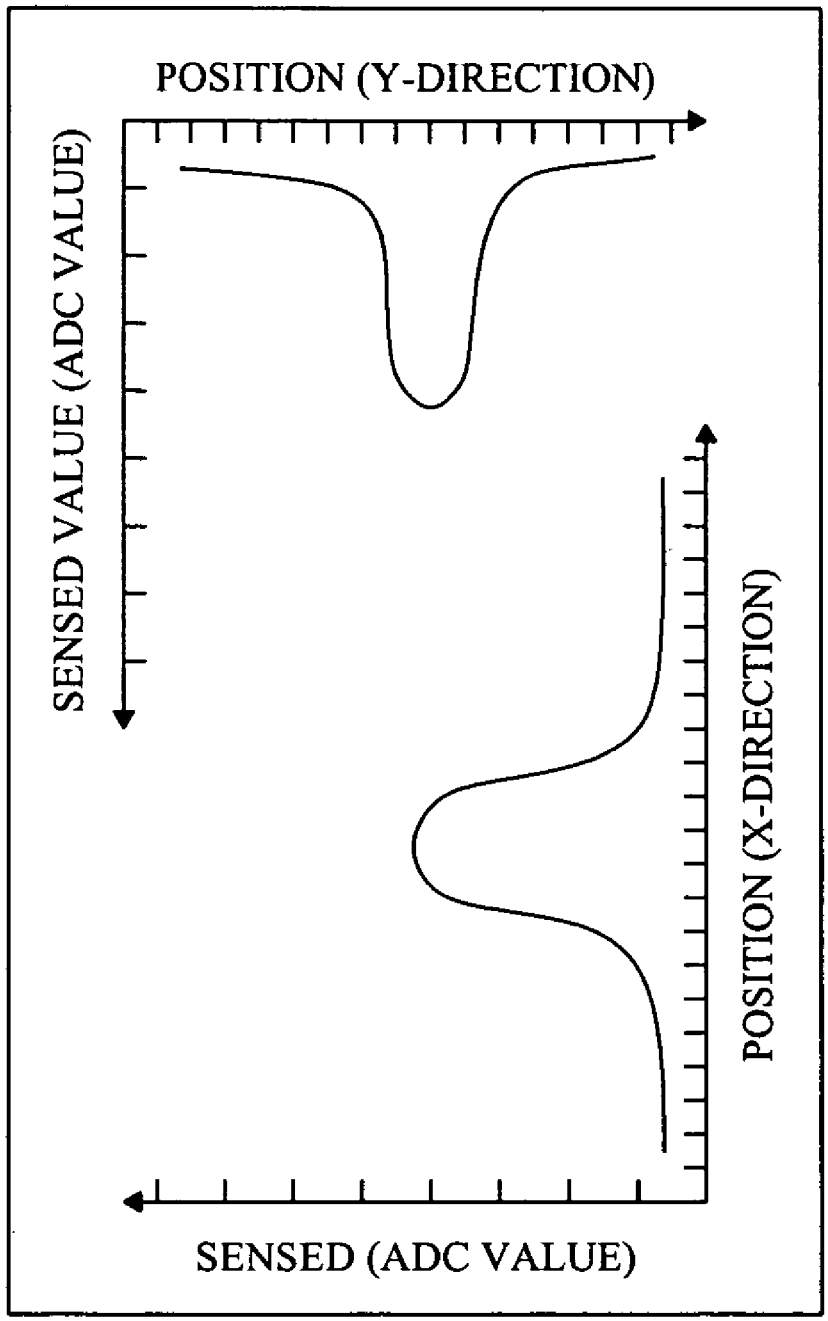
FIG. 2 is the relationship drawing between sensed quantity and location of the touchpad of FIG. 1.
Figure 3:
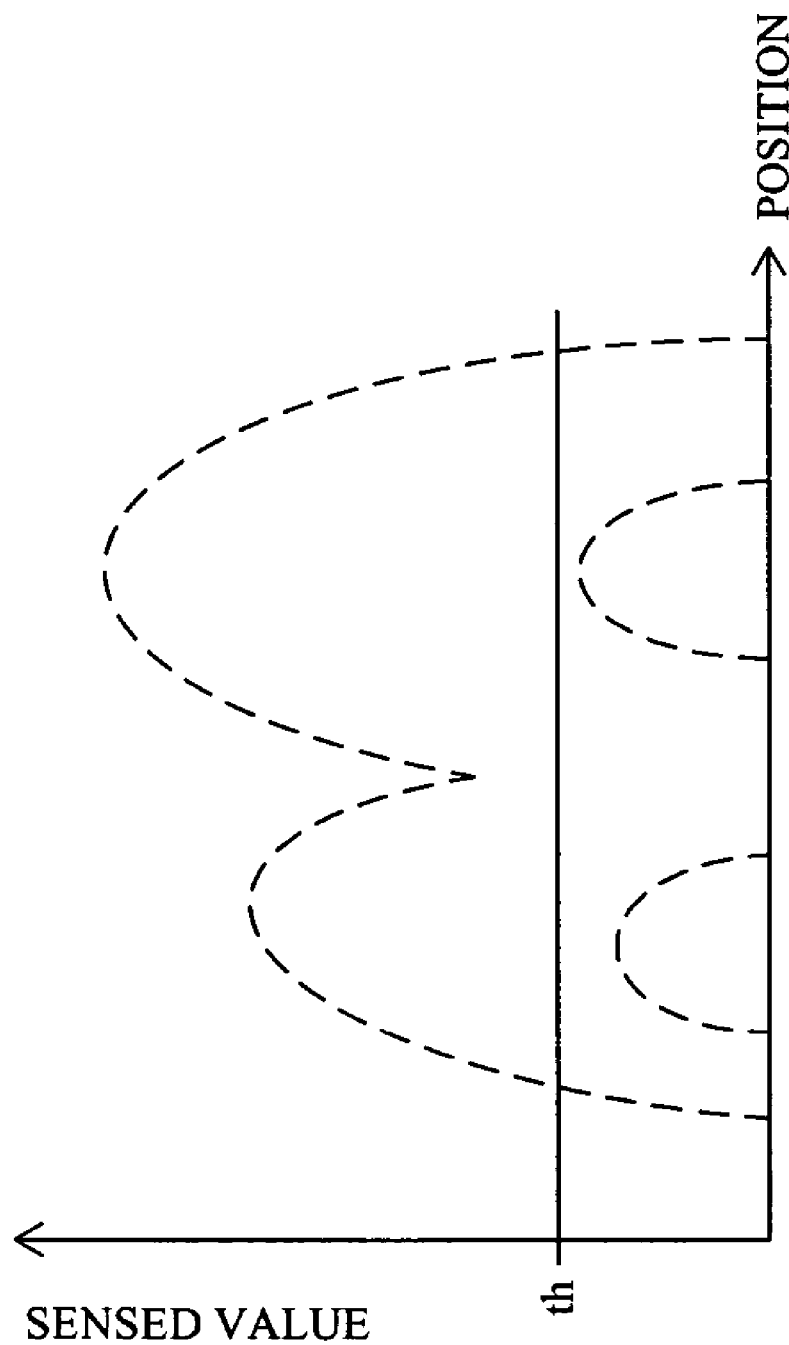
FIG. 3 is the detected sensed quantity change when two fingers are touching touchpad.
Figures 4A, 4B, 4C:
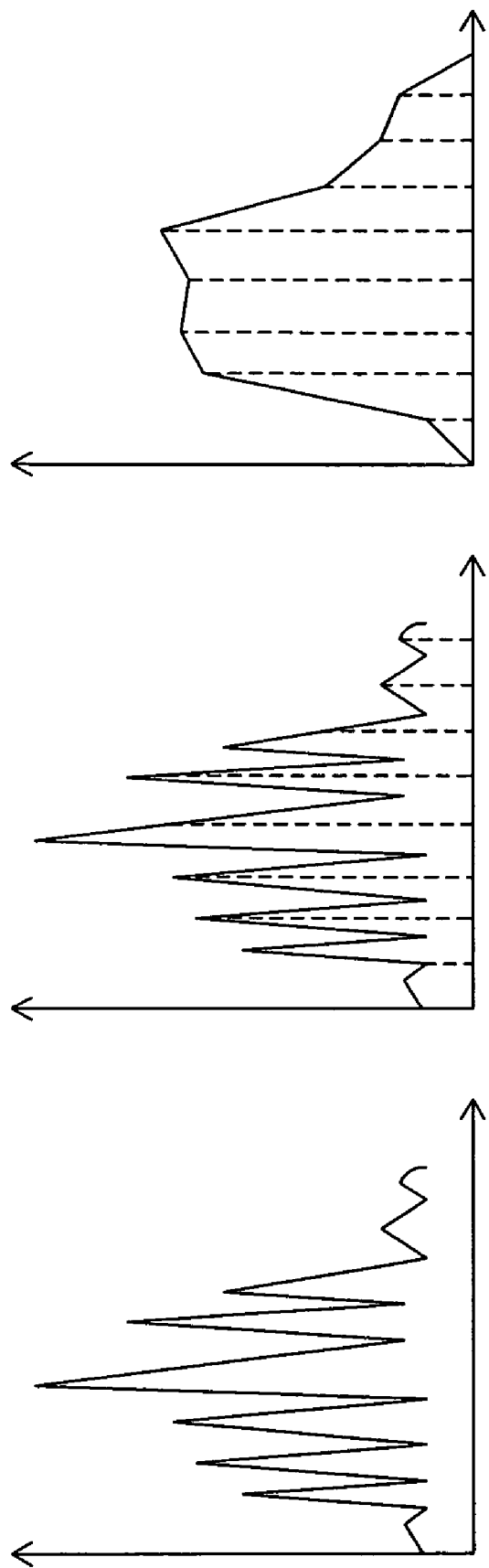
FIG. 4A displays noise.
FIG. 4B is the sensed quantity obtained when noise in FIG. 4A is converted by analog digital converter.
FIG. 4C is the waveform after sampling FIG. 4B.
Figure 5:
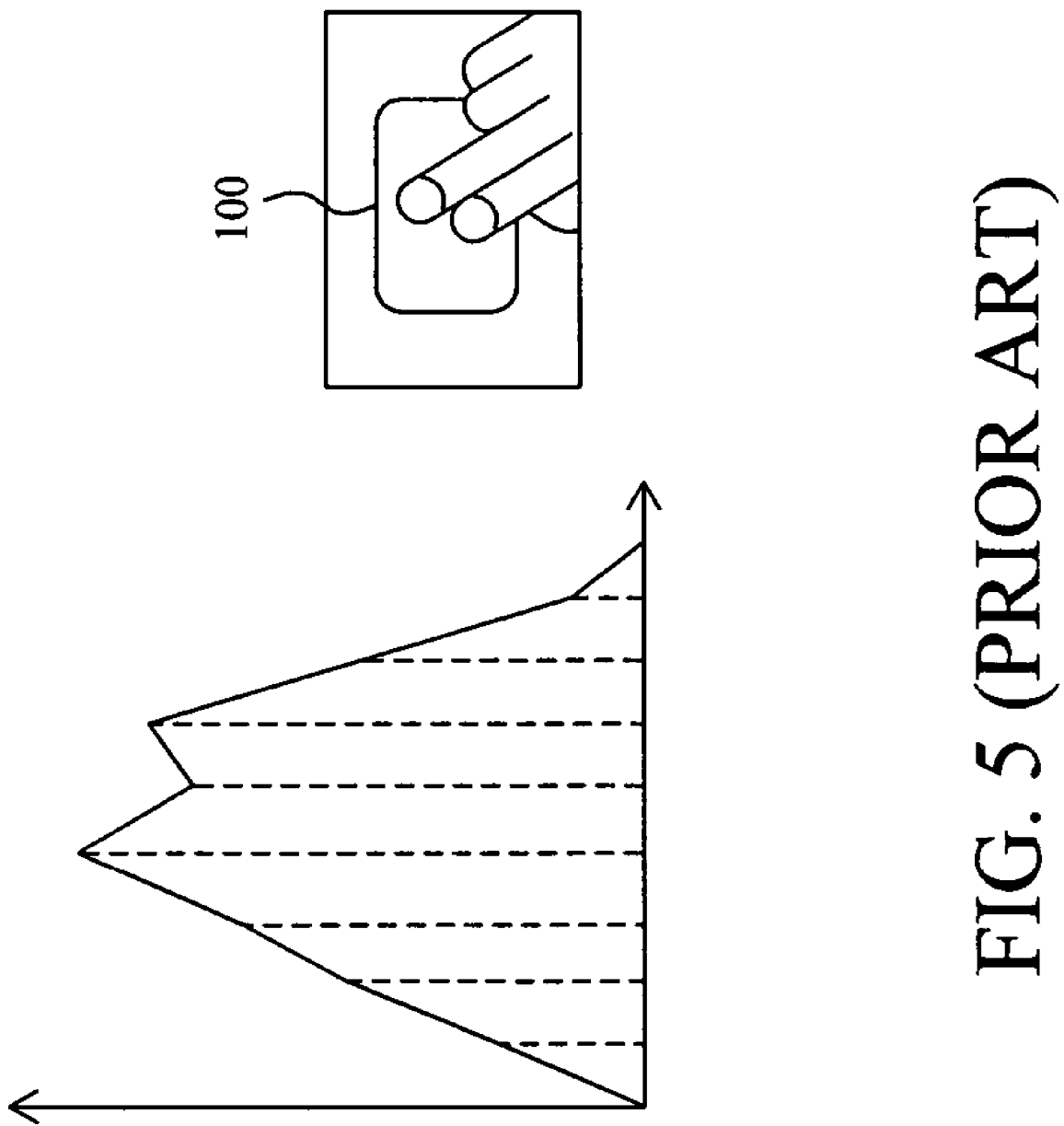
FIG. 5 is the detected waveform when two fingers are touching touchpad.
Figure 6:
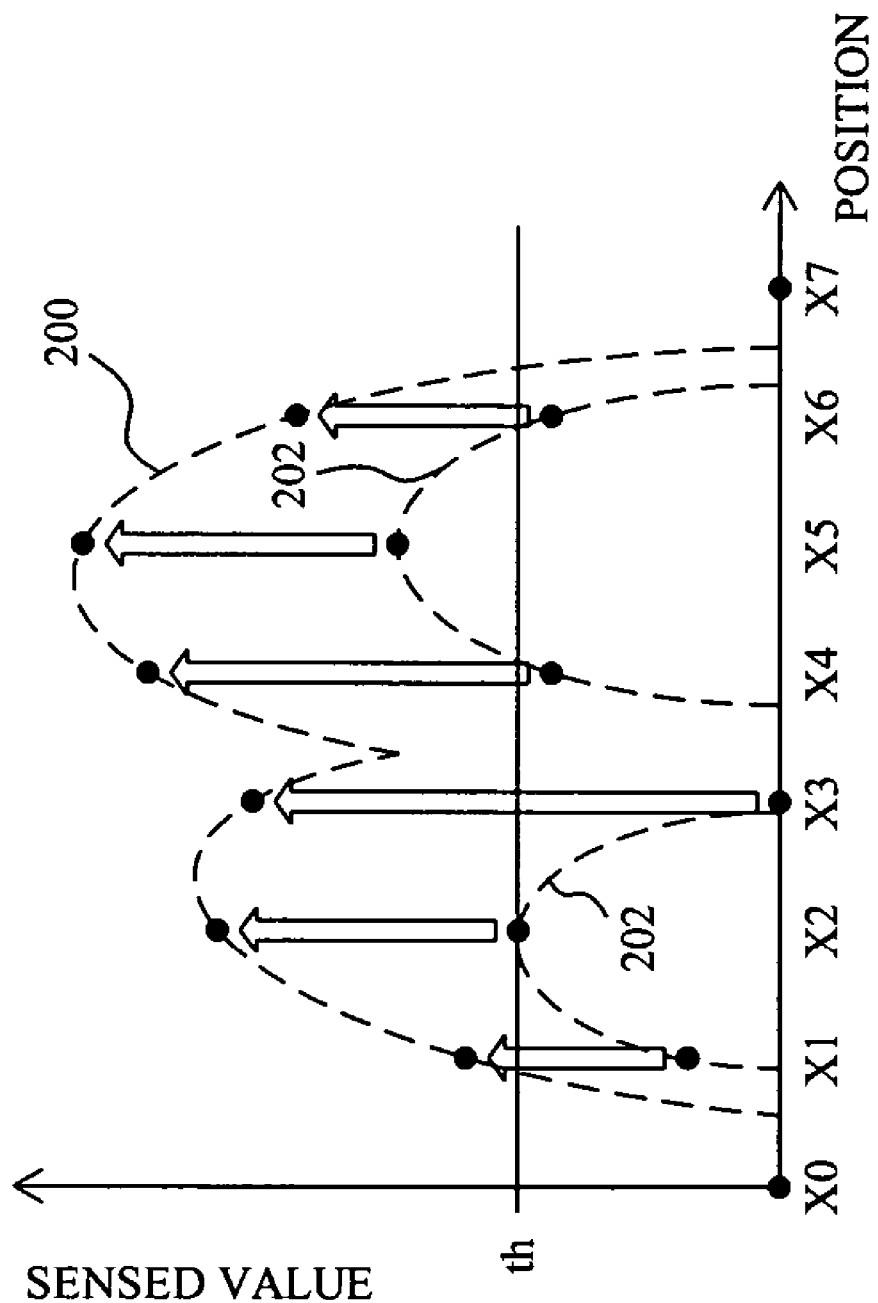
FIG. 6 is the detected sensed quantity change after sensed quantity is larger than the critical value th.
Figure 7:
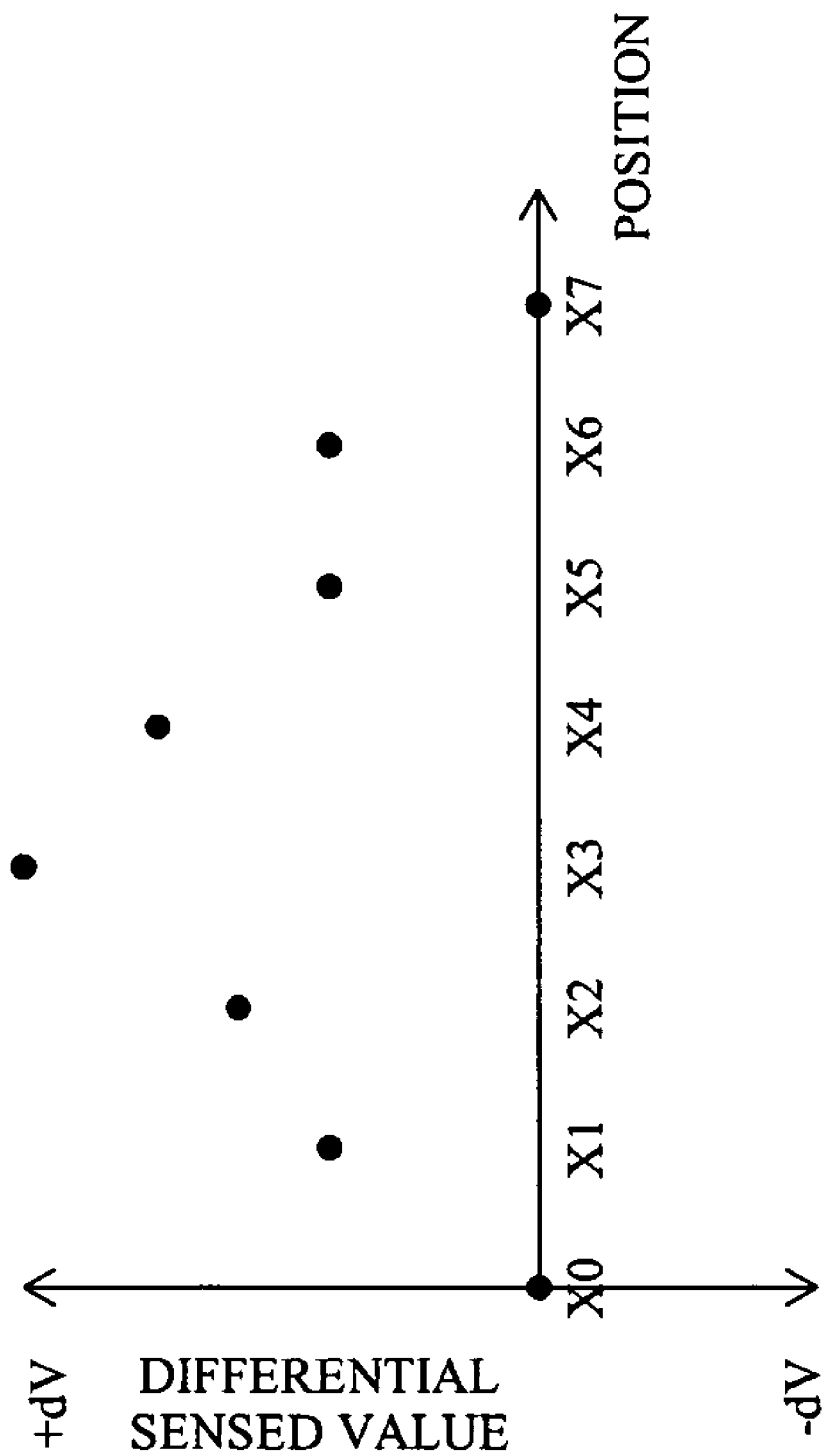
FIG. 7 is the difference between two sensed quantities in FIG. 6.
Figure 8:
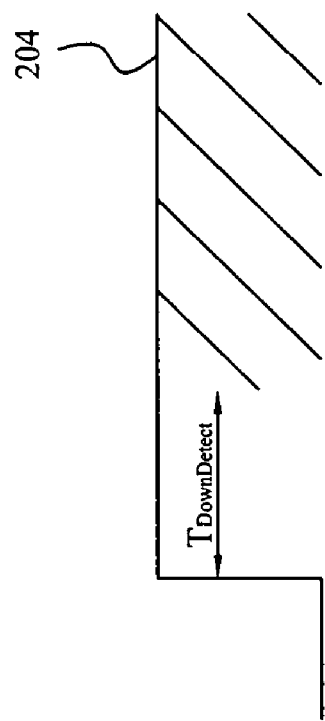
FIG. 8 displays detected signal.

FIG. 6 displays the detected sensed value change after two peak values of sensed value are all larger than critical value th wherein curve 200 is detected sensed value at this time, curve 202 is detected sensed value at last time. FIG. 7 is the difference of the two sensed values in FIG. 6, FIG. 8 shows detected signal 204. Please refer to FIGS. 6, 7 and 8, in detecting the sensed value on touchpad, when the two peak values of sensed value detected is larger than critical value th, as shown in FIG. 6, detected signal 204 will turn from low level into high level, as shown in FIG. 8, then within time interval TDownDetect, sensed value on the touchpad is detected continuously, sensed value 202 detected last time is taken from sensed value 200 detected this time to get a sensed value difference value dV, as shown in FIG. 7, if the sensed value difference values dV obtained within time interval TDownDetect are all positive values, it means that two objects have touched touchpad. Wherein each peak value of sensed value is corresponded to one object, therefore, in other embodiment, if there are more than two objects touching the touchpad, the sensed values will be corresponded to more than two peak values.

<Detection for Verifying Multiple Objects Touch Gesture>

Figure 9:
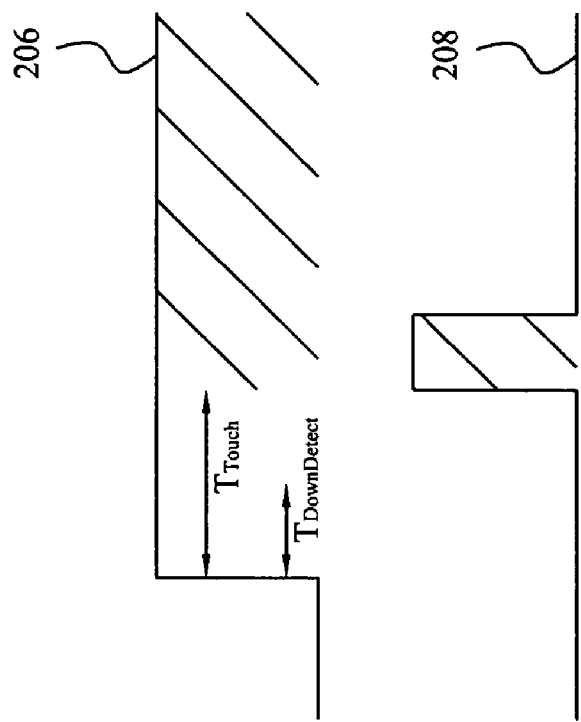
FIG. 9 displays detected signal and touched signal.

FIG. 9 shows detected signal 206 and touch signal 208. After detecting at least two objects touch touchpad, it will start counting the staying time of the at least two objects on touchpad, when the above-mentioned "A detection method for verifying multiple objects touch" has been confirmed and objects have touched touchpad, calculate the number of objects touching touchpad, if the at least two objects stay continuously on touchpad with a time greater than a preset time $T_{Touch}$, send out multiple objects touch signal 208 and calculate locations of the at least two objects and sends out location signals. Wherein the multiple objects touch signal 208 can include information of object number.

<Detection for Verifying Multiple Objects Leaving>

Figure 10:
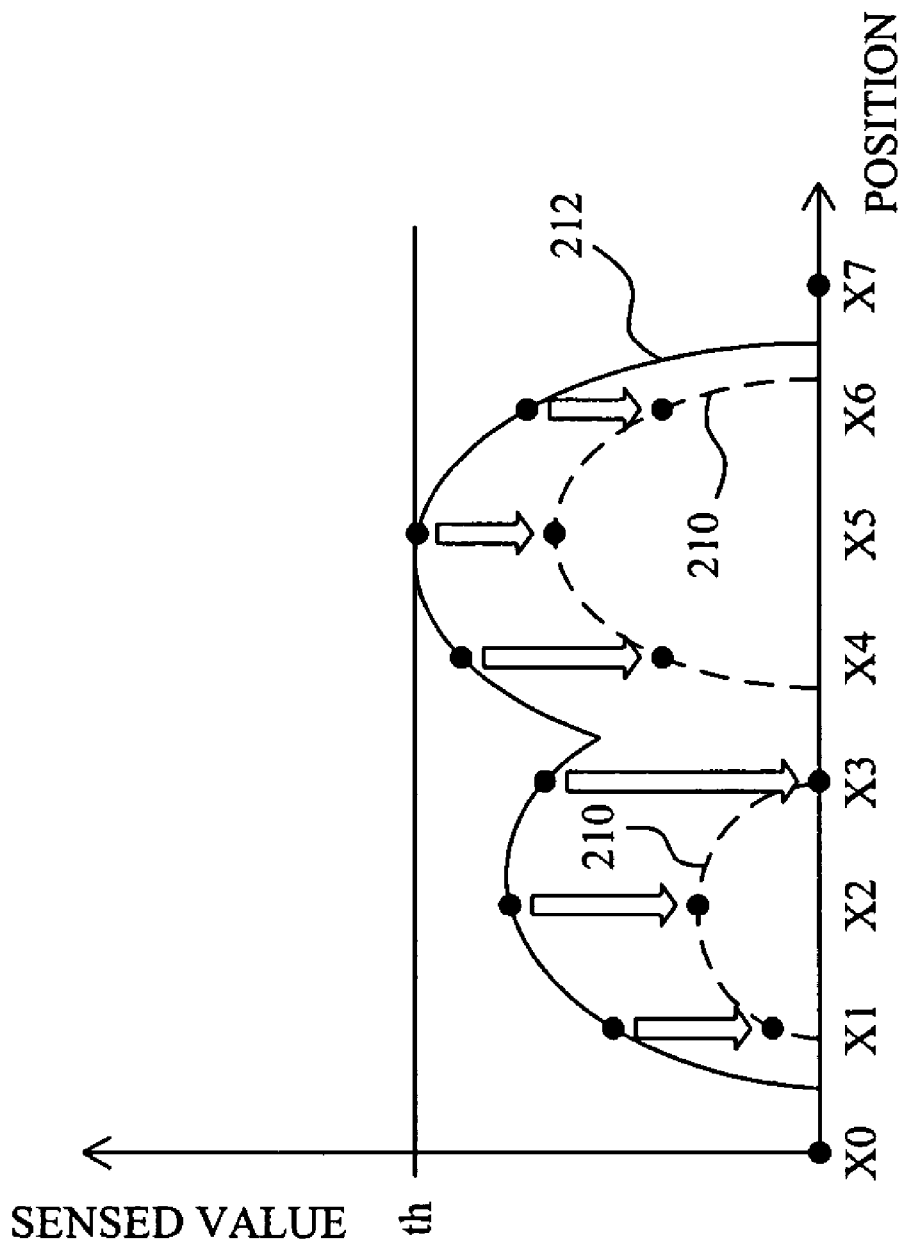
FIG. 10 is the detected sensed quantity change after sensed quantity is smaller than the critical value th.
Figure 11:
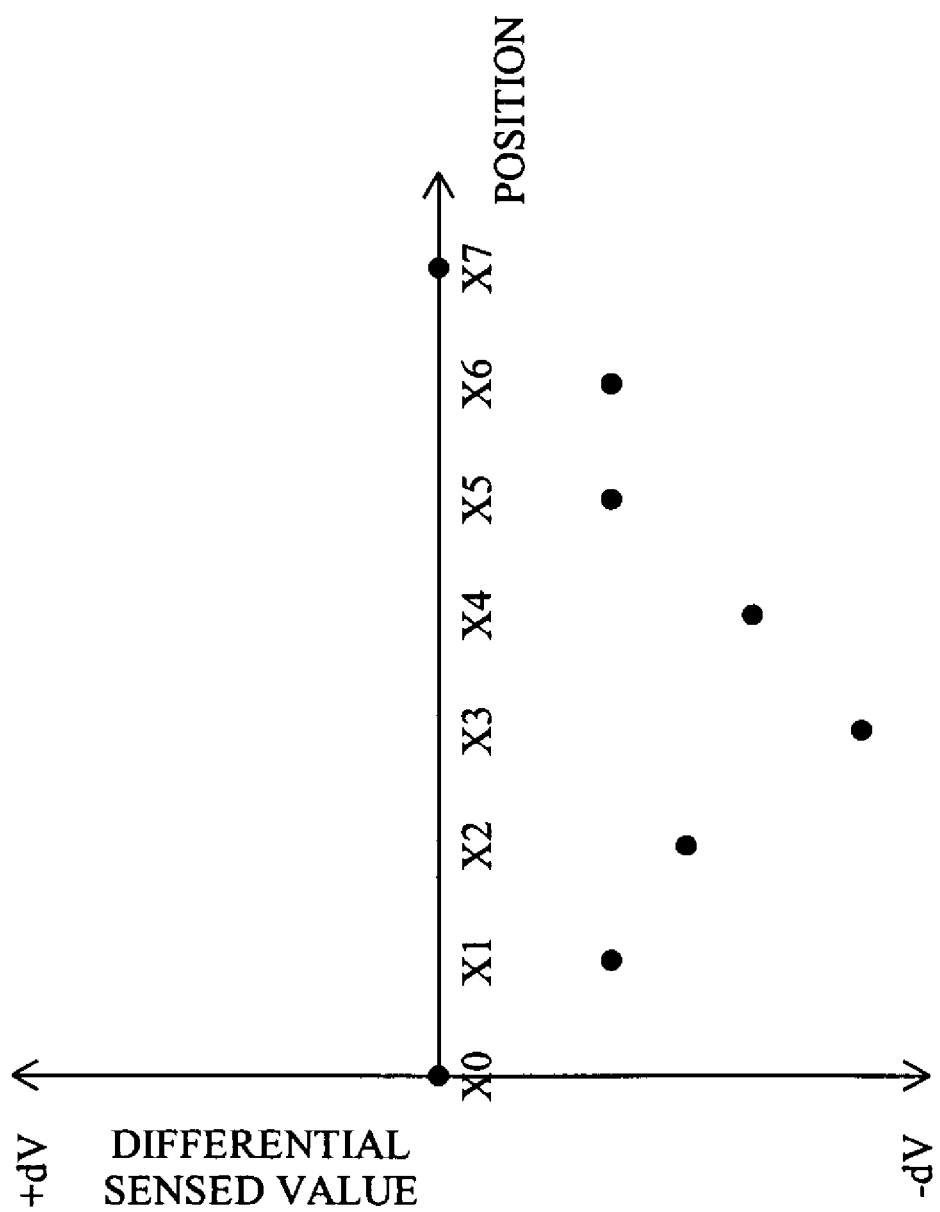
FIG. 11 is the difference between two sensed quantities in FIG. 10.
Figure 12:
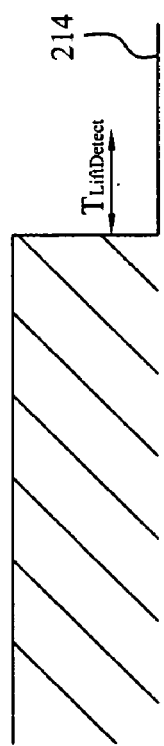
FIG. 12 displays detected signal.

FIG. 10 shows detected sensed value change after two peak values of sensed values are smaller than critical value th, wherein curve 210 is sensed value detected at this time, curve 212 is sensed value detected last time. FIG. 11 is the difference value between two sensed values measured in FIG. 10. FIG. 12 shows detected signal 214. Please refer to FIGS. 10, 11 and 12, after object has touched touchpad, once at least one peak value of the two peak values of the detected sensed values is smaller than critical value th, in this embodiment, two peak values of the sensed values are all smaller than critical value, as shown in FIG. 10, detected signal 214 will change from high level to low level, as shown in FIG. 12, then within time interval $T_{LiftDetect}$, the detected sensed value is detected continuously, sensed value detected in the last time 212 is taken from sensed value detected each time 210 to get a sensed value difference value dV, as shown in FIG. 11, if the sensed value difference values dV obtained within time interval $T_{LiftDetect}$ are all negative values, it means that at least one object of the two objects has left touchpad.

<Detection for Verifying Multiple Objects Lift Gesture>

Figure 13:
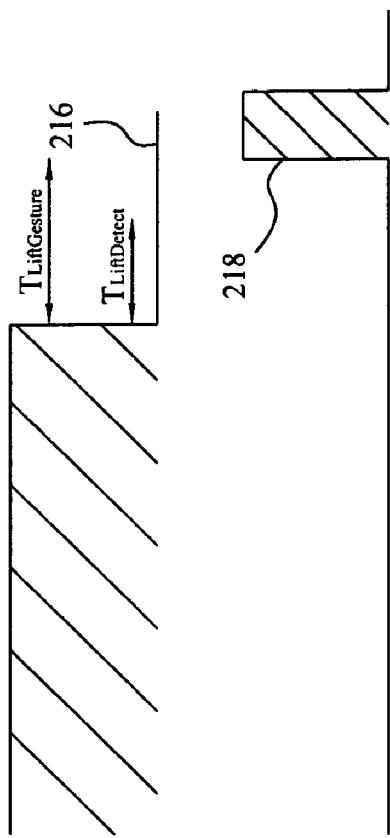
FIG. 13 displays detected signal and lift signal.

FIG. 13 shows detected signal 216 and lift signal 218. After object touches touchpad, once at least one object leaving touchpad is detected, start to calculate the leaving time of the at least one object leaving touchpad, and calculate number of objects left on the touchpad, if there is still object left on touchpad, calculate its location and send out location signal, if it meets the above-mentioned "A detection method for verifying multiple objects leaving" and the leaving time is greater than a preset time of $T_{LiftGesture}$, send out lift signal 218. Similarly, the lift signal 208 can include information of object number.

<Detection for Multiple Objects Tap Gesture>

Figure 14:
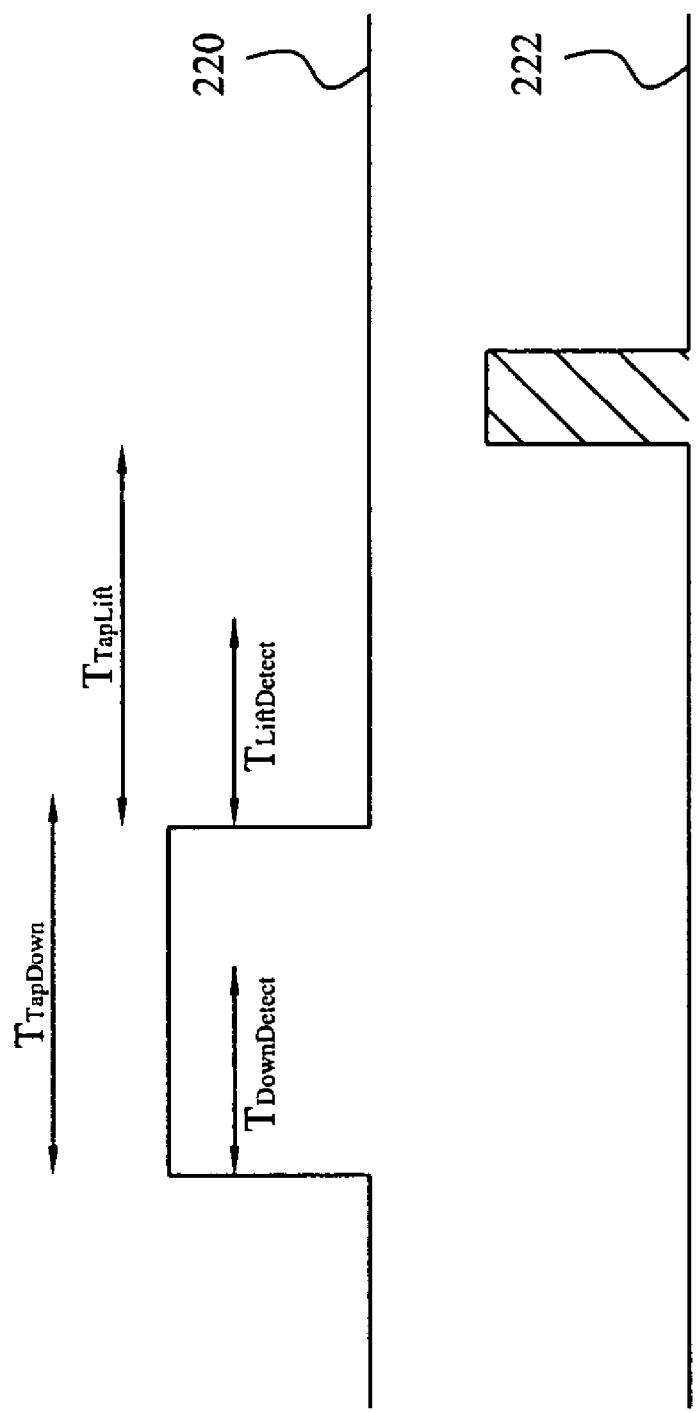
FIG. 14 displays detected signal and single click signal.

FIG. 14 shows detected signal 220 and single click signal 222. When at least two objects touching touchpad are detected, detected signal 220 will change from low level to high level, as shown in FIG. 14, then calculate the touching time for the object touching the touchpad and calculate the number of object, when "A detection method for verifying multiple objects touching" is confirmed and met, and if all objects leaving the touchpad are detected when the touching time is smaller than a preset time $T_{TapDown}$, then detected signal 220 will change from high level to low level, again calculate the leaving time of the object leaving the touchpad, if it meets "A detection method for verifying multiple object leaving" and the leaving time is larger than a preset time of $T_{TapLift}$, send out a single click signal 222, in the mean time, calculate the single click locations of the at least two objects and send out location signals.

<Detection for Multiple Objects Double Tap>

Figure 15:
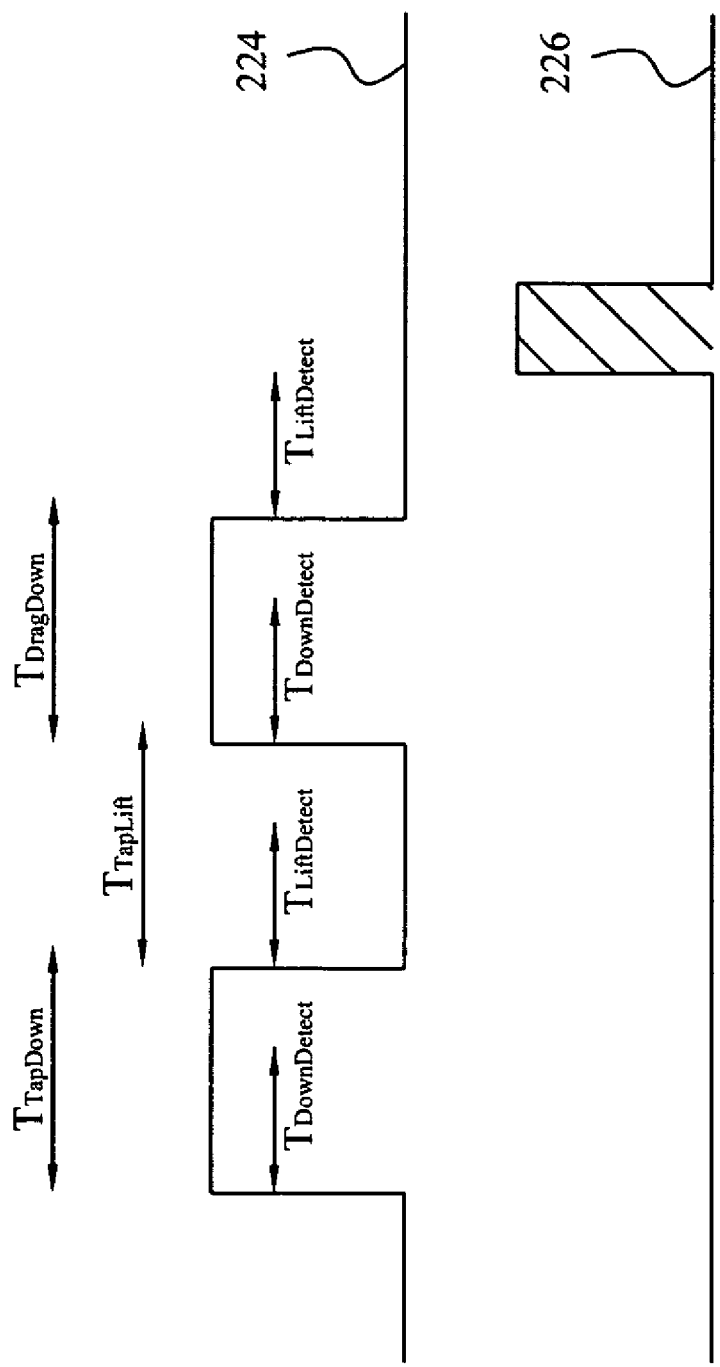
FIG. 15 displays detected signal and double click signal.

FIG. 15 shows detected signal 224 and dragging signal 226. When the first time at least two objects touch touchpad is detected, detected signal 224 will change from low level to high level, as shown in FIG. 15, then calculate first touching time of object touching the touchpad and calculate the number of objects, make sure it meets "A detection method for verifying multiple objects touching" and under the condition the object number is not changed, meanwhile, all the objects leaving the touchpad is detected when the first touching time is smaller than preset time $T_{TapDown}$, then detected signal 224 will change from high level to low level, further calculate the leaving time of at least two objects leaving the touchpad, make sure it meets "A detection method for verifying multiple objects leaving", meanwhile, all the objects touching the touchpad for the second time are detected again when the leaving time is smaller than preset time $T_{TapLift}$, then detected signal 224 will change again from low level to high level, then calculate second touching time when the touchpad is touched for the second time, make sure it meets "A detection method for verifying multiple objects touching" and under the condition the object number is not changed, meanwhile, all the objects again leave the touchpad is detected once more if the second touching time is smaller than a preset time $T_{DragDown}$, then detected signal 224 will change from high level to low level, make sure it meets "A detection method for verifying multiple objects leaving", then send out double click signal 226, in the mean time, calculate the locations of the at least two objects and send out location signals.

<Detection for Multiple Objects Drag Gesture>

Figure 16:
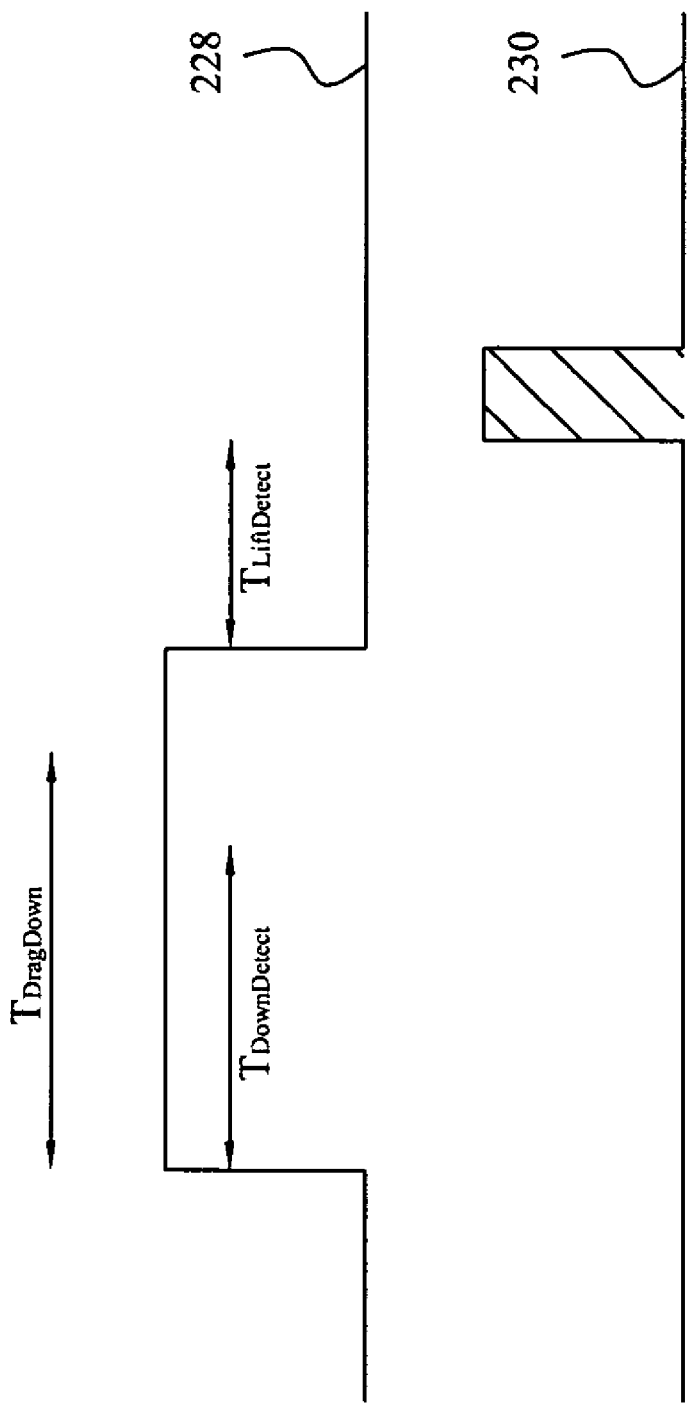
FIG. 16 displays detected signal and dragging signal.

FIG. 16 shows detected signal 228 and dragging signal 230. When the first time at least two objects touch touchpad is detected, detected signal 228 will change from low level to high level, as shown in FIG. 16, then calculate first touching time of the at least two objects touching the touchpad and calculate object number wherein object number must be greater than or equal to 2, make sure it meets "A detection method for verifying multiple objects touching" and under the condition the object number is not changed, meanwhile, at least one object of the at least two objects leaving the touchpad is detected when the first touching time is larger than preset time $T_{TapDown}$, then detected signal 228 will change from high level to low level, further calculate the leaving time of the object leaving the touchpad, make sure it meets "A detection method for verifying multiple objects leaving" and the number of objects left on the touchpad, then send out dragging signal 230 and, in the same time, calculate location of the object and send out location signal.

In each of the above-mentioned embodiments, through a comparison between sensed value change and a preset time, we can verify all kinds operation on touchpad, misjudgment due to interference from noise can thus be prevented.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as string forth in the appended claims.

What is claimed is:

1. A multiple objects detection method for capacitive touchpad, comprising:

detecting sensed value on the touchpad and getting at least a first peak value and a second peak value; and calculating the change of the sensed value when the first peak value and the second peak value are all greater than a threshold value;

wherein if the sensed value remains greater than the threshold value within a preset time, $T_{DownDetect}$, and remains a continuously increasing trend during said preset time, $T_{DownDetect}$, wherein such signifies that at least two objects are touching the touchpad.

2. The multiple objects detection method of claim 1, further comprising:
- calculating the object number on the touchpad;
- calculating the touching time of the at least two objects touching the touchpad; and
- sending out a touch signal if the touching time reaches a second preset time, $T_{Touch}$,
- wherein object number on the touchpad remains constant when calculating the touching time.

3. The multiple objects detection method of claim 2, further comprising calculating the locations of the at least two objects and sending out a location signal.

4. A multiple objects detection method for a capacitive touchpad, comprising:
- verifying at least two objects touch the touchpad;
- detecting sensed value on the touchpad and getting at least a first peak value and a second peak value; and
- calculating the change of the sensed value when at least one value of the first and second peak value is smaller than a threshold value;
- wherein if the first or second peak value remains less than the threshold value within a preset time, $T_{LiftDetect}$, and maintains a continuously decreasing trend during the preset time, $T_{LiftDetect}$, wherein such signifies that at least one object of the at least two objects has been removed from the touchpad.

5. The multiple objects detection method of claim 4 wherein steps of verifying the at least two objects touch the touchpad comprising:
- detecting sensed value on the touchpad and getting at least a first peak value and a second peak value; and
- calculating the change of the sensed value when both the values of the first and second peak are larger than a threshold value;
- wherein if the sensed value remains greater than the threshold value within a second preset time, $T_{DownDetect}$, and maintains a continuously increasing trend during the second preset time, $T_{DownDetect}$, wherein such signifies that the at least two objects are touching the touchpad.

6. The multiple objects detection method of claim 4, further comprising:
- calculating the leaving time of the at least one object leaving the touchpad;
- sending out a leaving signal when the leaving time is greater than a second preset time, $T_{LiftGesture}$; and
- calculating the object number on the touchpad;
- wherein if the object number left on the touchpad is not zero, calculate the object location left on the touchpad, send out a location signal.

7. A multiple objects detection method for capacitive touchpad, comprising:
- verifying at least two objects touching the touchpad;
- calculating object number touching the touchpad;
- calculating touching time of the at least two objects touching the touchpad;
- if the touching time is smaller than a first preset time, $T_{TapDown}$, verify all objects have left the touchpad;
- calculating the leaving time of all the objects leaving the touchpad; and
- if the leaving time is greater than a second preset time, $T_{TapLift}$, send out a single click signal;
- wherein, the object number on the touchpad remains constant when the touching time is calculated.

8. The multiple objects detection method of claim 7 wherein the steps of verifying at least two objects touching the touchpad comprising:
- detecting sensed value on the touchpad and getting at least a first peak value and a second peak value; and
- calculating the change of the sensed value when both the values of the first and second peak are larger than a threshold value;
- wherein if the sensed value remains greater than the threshold value within a third preset time, $T_{DownDetect}$, and maintains a continuously increasing trend during the third preset time, $T_{DownDetect}$, wherein such signifies that the at least two objects are touching the touchpad.

9. The multiple objects detection method of claim 8, further comprising calculating the locations of the at least two objects and sending out a location signal.

10. The multiple objects detection method of claim 7 wherein the steps of verifying all objects leaving the touchpad comprising:
- detecting sensed value on the touchpad and getting at least a first peak value and a second peak value; and
- calculating the change of the sensed value when both the values of the first and second peak are smaller than a threshold value;
- wherein if the sensed value remains less than the threshold value within a third preset time, $T_{LiftDetect}$, and maintains a continuously decreasing trend during the third preset time, $T_{LiftDetect}$, wherein such signifies that the at least two objects leave the touchpad.

11. A multiple objects detection method for capacitive touchpad, comprising:
- verifying at least two objects touching the touchpad;
- calculating object number touching the touchpad;
- calculating a first touching time of the at least two objects touching the touchpad;
- if the first touching time is smaller than a first preset time, $T_{TapDown}$, verify the at least two objects have left the touchpad;
- calculating the leaving time of the at least two objects leaving the touchpad; and
- if the leaving time is smaller than a second preset time $T_{TapLift}$, then verify at least two objects touch the touchpad;
- calculating a second touching time of the at least two objects touching the touchpad;
- if the second touching time is smaller than a third preset time $T_{DragDown}$, verify the at least two objects have left the touchpad; and
- send out a double click signal;
- wherein, the object number touching the touchpad remains constant when the first and second touching time are calculated.

12. The multiple objects detection method of claim 11 wherein the steps of verifying at least two objects touching the touchpad comprising:
- detecting sensed value on the touchpad and getting at least a first peak value and a second peak value; and
- calculating the change of the sensed value when both the values of the first and second peak are larger than a threshold value;
- wherein if the sensed value remains greater than the threshold value within a fourth preset time, $T_{DownDetect}$, and maintains a continuously increasing trend during the fourth preset time, $T_{DownDetect}$, wherein such signifies that the at least two objects are touching the touchpad.

13. The multiple objects detection method of claim 11 wherein the steps of verifying at least two objects leaving the touchpad comprising:
- detecting sensed value on the touchpad and getting at least a first peak value and a second peak value; and calculating the change of the sensed value when both the values of the first and second peak are smaller than a threshold value;

wherein if the sensed value remains less than the threshold value within a fourth preset time, $T_{LiftDetect}$, and maintains a continuously decreasing trend during the fourth preset time, $T_{LiftDetect}$, wherein such signifies that the at least two objects leave the touchpad.

14. The multiple objects detection method of claim 11, further comprising calculating the locations of the at least two objects and sending out a location signal.

15. A multiple objects detection method for capacitive touchpad, comprising:
    verifying at least two objects touching the touchpad;
    calculating object number touching the touchpad;
    calculating the touching time of the at least two objects touching the touchpad;
    if the touching time is larger than a first preset time $T_{TapDown}$, verify at least one object of the at least two objects has left the touchpad;
    calculating object number left on the touchpad; and
    sending out a dragging signal;
    wherein the object number left on the touchpad remains constant when the touching time is calculated, and after at least one object has been removed from the touchpad, the object number left on the touchpad must be greater than or equal to 1.

16. The multiple objects detection method of claim 15 wherein the steps of verifying at least two objects touching the touchpad comprising:

detecting sensed value on the touchpad and getting at least a first peak value and a second peak value; and
    calculating the change of the sensed value when both the values of the first and second peak are larger than a threshold value;
    wherein if the sensed value remains greater than the threshold value within a second preset time, $T_{DownDetect}$, and maintains a continuously increasing trend during the second preset time, $T_{DownDetect}$, wherein such signifies that the at least two objects are touching the touchpad.

17. The multiple objects detection method of claim 15 wherein the steps of verifying at least one object of the at least two objects has been removed from the touchpad comprising:
    detecting sensed value on the touchpad and getting at least a first peak value and a second peak value; and
    calculating the change of the sensed value when at least one of the first and second peak value is smaller than a threshold value;
    wherein if the first or second peak value remains less than the threshold value within a second preset time, $T_{LiftDetect}$, and maintains a continuously decreasing trend during the second preset time, $T_{LiftDetect}$, wherein such signifies that at least one object of the at least two objects has been removed from the touchpad.

18. The multiple objects detection method of claim 15, further comprising calculating the locations of all objects left on the touchpad and sending out a location signal.

* * * * *